(12) United States Patent
Tuttle

(10) Patent No.: US 9,926,914 B2
(45) Date of Patent: Mar. 27, 2018

(54) METHOD AND SYSTEM OF EXTRACTING ENERGY FROM WIND

(75) Inventor: John R. Tuttle, Longmont, CO (US)

(73) Assignee: Windpipe Corporation, Manvel, TX (US)

( * ) Notice: Subject to any disclaimer, the term of this patent is extended or adjusted under 35 U.S.C. 154(b) by 434 days.

(21) Appl. No.: 14/421,515

(22) PCT Filed: Aug. 13, 2012

(86) PCT No.: PCT/US2012/050581
§ 371 (c)(1),
(2), (4) Date: Feb. 13, 2015

(87) PCT Pub. No.: WO2014/027992
PCT Pub. Date: Feb. 20, 2014

(65) Prior Publication Data
US 2015/0204310 A1  Jul. 23, 2015

(51) Int. Cl.
| | |
|---|---|
| *F15B 21/12* | (2006.01) |
| *F03D 9/00* | (2016.01) |
| *F03G 7/00* | (2006.01) |
| *F03D 5/00* | (2006.01) |

(52) U.S. Cl.
CPC ............... *F03D 9/00* (2013.01); *F03D 5/00* (2013.01); *F03G 7/00* (2013.01); *F03G 7/002* (2013.01); *F15B 21/12* (2013.01); *Y02E 10/70* (2013.01)

(58) Field of Classification Search
CPC ... F03D 9/00; F03D 9/41; F03G 7/002; F15B 21/12

USPC .................................... 60/398; 290/44, 55
See application file for complete search history.

(56) References Cited

U.S. PATENT DOCUMENTS

| | | | | |
|---|---|---|---|---|
| 5,770,893 A | * | 6/1998 | Youlton | F03B 13/142 60/398 |
| 8,330,289 B2 | * | 12/2012 | Tuttle | F03D 9/00 290/44 |
| 2011/0233936 A1 | | 9/2011 | Pabon et al. | |
| 2012/0119507 A1 | | 5/2012 | Tuttle | |

FOREIGN PATENT DOCUMENTS

| | | | | |
|---|---|---|---|---|
| JP | 2010-169054 A | | 8/2010 | |
| KR | 10-1029470 B1 | | 4/2011 | |
| WO | WO 2011011109 A1 | * | 1/2011 | ............... F03D 9/00 |

OTHER PUBLICATIONS

PCT Application No. PCT/US2012/050581 Search Report dated Mar. 5, 2013.

* cited by examiner

*Primary Examiner* — Michael Leslie
(74) *Attorney, Agent, or Firm* — Conley-Rose

(57) ABSTRACT

Extracting energy from wind. At least some of the illustrative embodiments are methods including: directing fluid flow across an aperture of a nozzle in operational relationship with an resonant cavity, a central axis of the nozzle and the central axis of the resonant cavity nonconcentric, and the resonant cavity has a resonant frequency; creating pressure waves within the resonant cavity, the pressure waves created at least in part by vortices within the fluid flow across the aperture; and extracting energy from pressure waves within the resonant cavity.

9 Claims, 8 Drawing Sheets

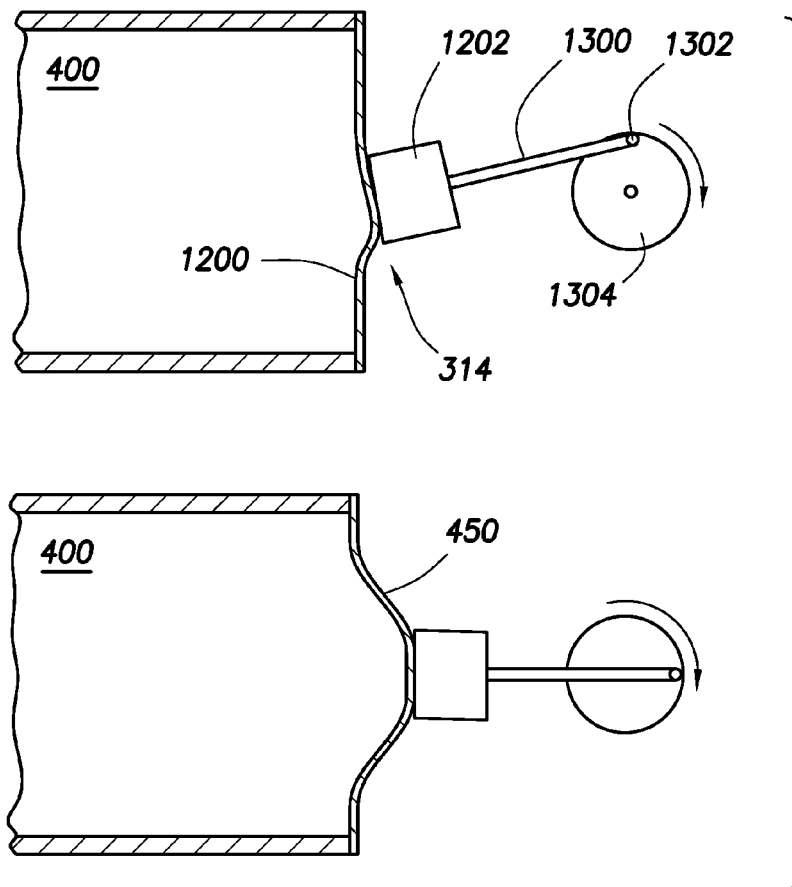
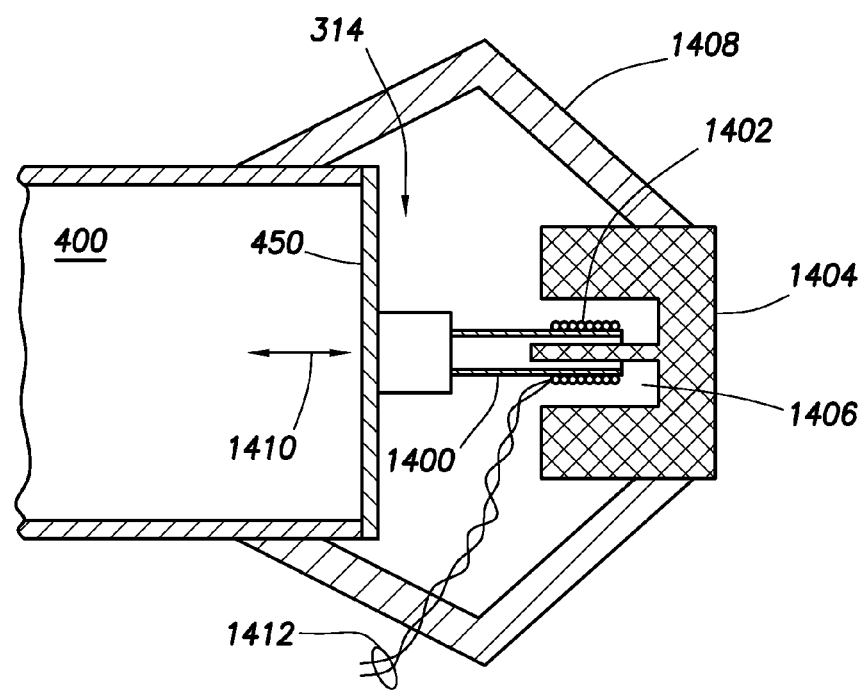

METHOD AND SYSTEM OF EXTRACTING ENERGY FROM WIND

BACKGROUND

Renewable energy sources are a topic of much importance in view of the geopolitical landscape, as well as perceived climate change. One of the more popular renewable energy sources is wind energy. Wind energy has been used as a source mechanical power for hundreds of years, and in more modern times has been used as a source of electrical energy. In the case of creating electrical energy, the air flow of wind is used to turn a propeller (i.e., wind passing blades of large wind generators cause rotation), and the rotational mechanical energy is then converted to electrical energy.

In spite of the many technological advances, propeller-driven wind generation still has many drawbacks. For example, most large scale propeller-driven wind generation systems use a governor in winds over about 22 miles per hour (MPH), and thus the additional energy in wind in excess of 22 MPH is lost. Moreover, large propeller-driven wind generation has adverse environmental consequences. In particular, the turning blades are a hazard to flying animals, particularly migratory animals such as birds and bats.

Beyond the environmental issues, large propeller-driven wind generation is also expensive to construct and maintain. The cost of transporting the large propeller-driven wind generation components to the fields is high. Moreover, the mechanical components and electrical circuitry are perched atop a tower that may be on the order of 100 to 250 feet above the ground, which is expensive to build and to maintain.

BRIEF DESCRIPTION OF THE DRAWINGS

For a detailed description of example embodiments, reference will now be made to the accompanying drawings in which:

FIG. 13 shows a series of cross-sectional elevation views to show example operation of a resonant structure in accordance with at least some embodiments;

FIG. 14 shows a cross-sectional elevation view of a resonant structure in accordance with at least some embodiments.

NOTATION AND NOMENCLATURE

Figure 1:
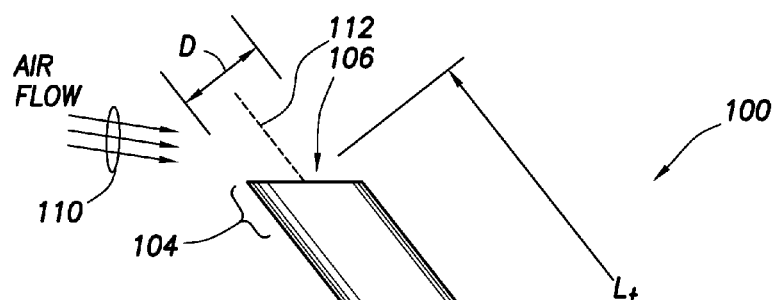
FIG. 1 shows a side elevation view of a vortex tube.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"About" in relation to lengths, widths, or angles shall mean the recited value plus or minus ten percent (10%).

"Hemispherical" in relation to the shape of an object shall not require the object to be half of a sphere.

"Central axis" shall mean an imaginary line that lies along the geometric center of a resonant cavity or volume, but having a central axis shall not require that the resonant cavity or volume be symmetrical about the central axis. Thus, for example, an imaginary line running along the center of a rectangular passageway shall be considered a central axis, even though rotational symmetry along the central axis does not exist.

"Direction of fluid flow" or "direction of air flow" shall mean the direction of the air or fluid flow measured just before the air or fluid flow encounters a leading edge of an aperture.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to extracting useful energy from wind, where the extraction does not rely on the wind turning propellers. More particularly, the various embodiments are directed to systems where a fluid flow causes pressure waves (e.g., acoustic waves) in the fluid within a resonant cavity. The pressures waves create vibratory or oscillatory motion, and useful work is extracted from the oscillatory motion. More particularly still, various embodiment are directed to improvements in design and construction of vortex tubes of the type described in the co-pending and commonly assigned U.S. patent application Ser. No. 13/384,555 (Now U.S. Pat. No. 8,330,289) titled "Method and systems of extracting energy from wind" filed Jan. 18, 2012, which application is incorporated by reference herein as if reproduced in full below. This specification first turns to the vortex tube described in the related application for purposes of orienting the reader, and then turns to various example systems and methods.

FIG. 1 shows a side elevation view of a vortex tube 100. In particular, the vortex tube 100 comprises a cylindrical outer body or tube 102 that defines a resonant cavity. The vortex tube 100 further comprises an entrance portion 104 having an aperture 106. Further, the vortex tube 100 comprises a resonant structure 108. The vortex tube 100 defines a length (labeled $L_t$ in the drawings), an internal diameter (labeled D in the drawings), and has one or more resonant frequencies.

The one or more resonant frequencies of the vortex tube 100 are created by air flow across the entrance portion 104, as illustrated by air flow 110. The air flow 110 across the aperture 106 formed by the entrance portion 104 results in the creation of vortices that, in turn, create the acoustic waves within the vortex tube 100 at one or more of the resonant frequencies. Air flow 110 across aperture 106 of the resonant cavity in a particular range of physical circumstances results in creation of acoustic waves with sufficient energy to be useful in extracting energy from the air flow. As shown in FIG. 1, the aperture 106 is arranged and constructed such that the air flow 110 crosses the aperture at a non-right angle to the central axis 112 of the vortex tube 100. The acoustic waves created by the air flow 110 excite the resonant structure 108 such that oscillatory motion of the resonant structure occurs, and useful work (e.g., mechanical motion, generation of electrical energy), is extracted from the oscillatory motion.

Figure 2:
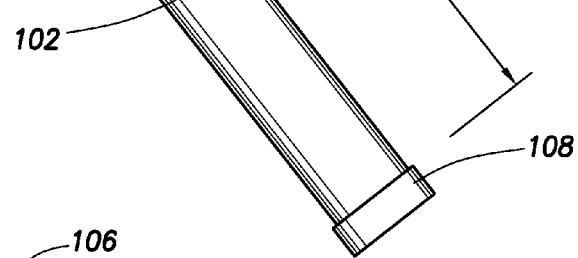
FIG. 2 shows a cross-sectional elevation view of portion of a vortex tube.

FIG. 2 shows a cross-sectional elevation view of the entrance portion 104 of the vortex tube 100 in order to show illustrative physical relationships. In particular, FIG. 2 shows the central axis 112 of the vortex tube 100. The air flow 110 directed toward the aperture 106 encounters the resonant cavity 202 after crossing the windward wall 200, and then the air flow encounters the leeward wall 204. The direction of air flow across the aperture is such that the acute angle α between the direction of air flow 110 and the central axis 112 is between 10 and 80 degrees inclusive, and more particularly between 40 and 50 degrees, inclusive.

Likewise, the orientation of the aperture 106 to the central axis 112 is a non-right angle. In particular, consider a line segment 206 (shown in dashed form) defined by two points on opposite sides of the aperture 106. The line segment 206 defined across the aperture 106 intersects the central axis 112 at a non-right angle. More particularly still, the acute angle β between the line segment 206 and the central axis 112 is between 10 and 80 degrees, and more particularly between 57 and 63 degrees, inclusive. It is noted that while the acute angle between a between the direction of air flow 110 and the central axis 112, and the acute angle β between the line segment 206 and the central axis 112, are disclosed to be within the same range of values, it does not necessarily follow that the respective angles are the same in practice. In fact, in a particular embodiment the acute angle α may be smaller than the acute angle β.

Air flow 110 that encounters the aperture 106 creates vortices, or swirls of air, behind the windward wall 200 within the entrance portion 104 of the vortex tube 100. Although the vortices may be created in any orientation, computer simulations performed indicate that each vortex swirls around an axis that is in many cases perpendicular to the air flow 110. Moreover, the direction of the swirl of each vortex tends to carry the vortex across the aperture 106 in the direction of the air flow. There are many physical mechanisms that may contribute to the creation of vortices at the aperture 106. For example, "vortex shedding" is a phenomenon where vortices are created as air flow moves over a surface, but the then the surface falls away relative to the direction of the air flow (i.e., a bluff). In cases where the bluff is not associated with a resonant cavity, the frequency of vortex shedding is directly related to the air flow velocity (i.e., the faster the air flow moves, the higher the vortex shedding frequency). By contrast, shear layer instabilities are associated with the interaction of two air flow streams flowing at different speeds, and the interaction creates vortices at the interface of the two streams. Vortex shedding and shear layer instabilities may be related in that air flow over a bluff in effect becomes a shear layer consideration at locations where the downstream surface falls away from the air flow. For purposes of this specification, and regardless of the precise physical mechanism at play, the term "vortex shedding" shall refer any mechanism which creates vortices at an aperture. The vortex shedding at the aperture 106 creates pressure or acoustic waves within the resonant cavity 202. The pressure waves created by the air flow 110 excite the resonant structure 108 such that oscillatory motion of the resonant structure occurs, and useful work (e.g., mechanical motion, generation of electrical energy), is extracted from the oscillatory motion.

The example vortex tube 100 is operational and may find use in many circumstances; however, the relationship of the direction of airflow 110 to the tube 102 (or equivalently, to the central axis 112) may create difficulties in some situations. For example, for larger scale generation of electricity, in placing the entrance portion 104 in the desired orientation with respect to the air flow 110, the tube 102 may have a large exposed surface area to the air flow, which may have several adverse effects. For example, the large exposed surface area results in large forces created by interaction of the wind and the vortex tube, leading to larger structural components to hold the vortex tube in place. The orientation may also affect the air flow over the entrance portion 104 of the vortex tube 100 and/or the air flow in relation to nearby vortex tubes (e.g., a second vortex tube could not be placed just below vortex tube 100 in the same orientation to the air flow 110, as the air flow direction would change after encountering vortex tube 100). In testing arrangements to address, at least in part, the issue of the exposed area of the vortex tube 102 to the air flow, various surprising results were discovered, which are presented below.

Figure 3:
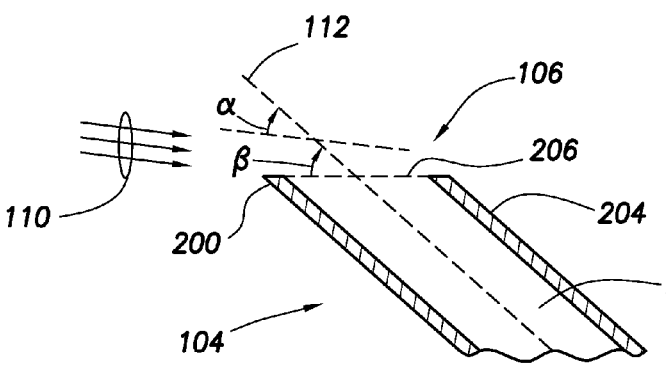
FIG. 3 shows a side elevation view of a vortex tube in accordance with at least some embodiments.

FIG. 3 shows a side elevation view of a vortex tube 300 in accordance with at least some embodiments. In particular, the example vortex tube 300 comprises an outer body or tube 302 that defines a resonant cavity (the resonant cavity not visible in FIG. 3). In the example system of FIG. 3, the tube 302 is cylindrical, but other cross-sectional shapes may be used. The tube 302 defines a first end 304 and a second end 306 opposite the first end 304. The vortex tube 300 further comprises a nozzle portion 308 (hereafter just "nozzle 308") coupled to the first end 304. The nozzle 308 defines an aperture 310, where the aperture 310 leads to the internal volume of the nozzle 308 and ultimately into the resonant cavity. In the example system of FIG. 3, the vortex tube 300 also comprises a hemispherical cap 312 coupled between the first end 304 of the tube 302 and the nozzle 308. The hemispherical cap 312 may be a separate structure which couples to the tube 302 (e.g., gluing, or acoustic welding), and to which the nozzle 308 couples. In other cases, the hemispherical cap 312 may be an integral structure with the tube 302. In the example system, a hemispherical cap 312 is used, but such is not required as other systems to seal the first end 304 of the resonant cavity 400 may be used (e.g., flat plate of FIG. 7, or conic structures). Further, the vortex tube 300 comprises a resonant structure 314 coupled to the second end 306 of the tube 302. The combination of the nozzle 304, and the resonant cavity defined by the tube 302, and the hemispherical cap 312 have a one or more resonant frequencies.

The one or more resonant frequencies of the vortex tube 300 are created by air flow across the nozzle 308, as illustrated by air flow 316. The air flow 316 across the aperture 310 formed by the nozzle 308 results in the creation of vortices that, in turn, create the acoustic waves within the resonant cavity of the vortex tube 300 at one or more of the resonant frequencies (e.g., standing pressure waves). The acoustic waves created by the air flow 316 excite the resonant structure 314 such that oscillatory motion of the resonant structure occurs, and useful work (e.g., mechanical motion, generation of electrical energy), is extracted from the oscillatory motion.

Figure 4:
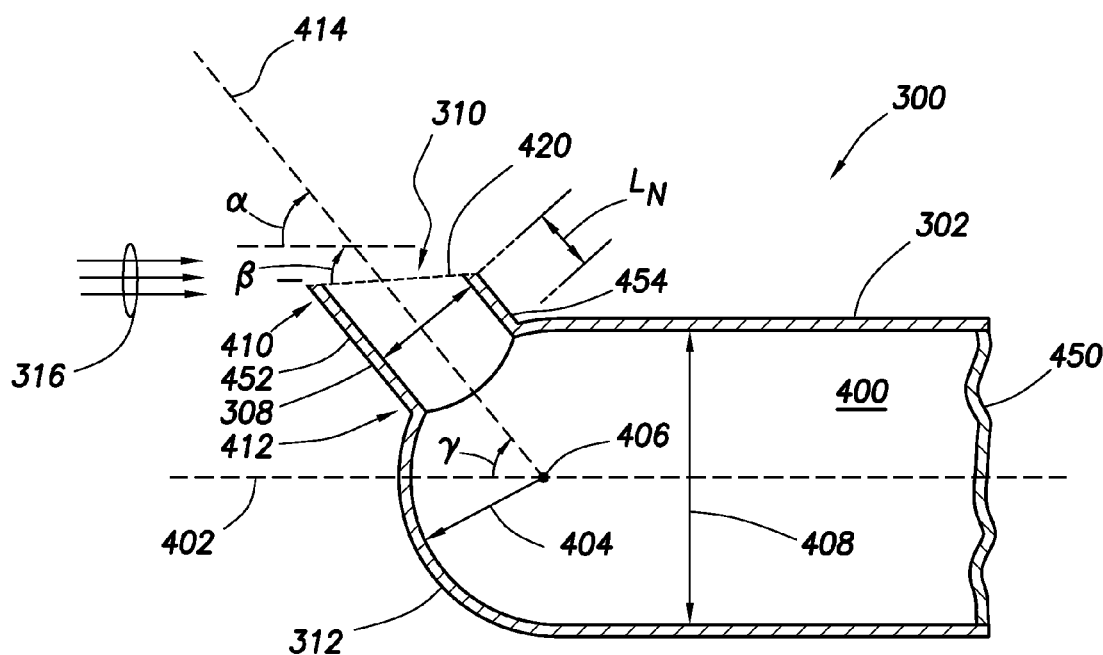
FIG. 4 shows a cross-sectional elevation view of a vortex tube in accordance with at least some embodiments.

FIG. 4 shows a cross-sectional elevation view of the vortex tube 300 in order to show illustrative physical relationships. In particular, FIG. 4 shows the resonant cavity 400 defined by the tube 302, the hemispherical cap 312 on the first end 304, and a flexible diaphragm 450 on the second end 306 (the flexible diaphragm part of the resonant structure 314). The resonant cavity 400 defines a central axis 402. The example hemispherical cap 312 defines a spherical shape having a radius 400 defined from a central point 406. In the example vortex tube 300, the hemispherical cap 312 is half a sphere, but hemispherical caps need not be precisely half a sphere in other cases. In the region where the resonant cavity 400 is defined by the tube 302 alone, the example resonant cavity 400 defines an internal diameter 408.

The nozzle 308 defines a first end 410 at which the aperture 310 is defined. The nozzle 308 further defines a second end 412 which, in the example of FIG. 4, is coupled to the tube 302 by way of the hemispherical cap 312. The nozzle 308 defines a central axis 414 and an internal volume defined by an inside dimension. In the example system of FIG. 3, the nozzle is formed by a cylindrical outer body, and thus defines an inside diameter 416. The internal volume is fluidly coupled to the resonant cavity 400. In the example system of FIG. 4, the central axis 414 of the nozzle 308 intersects the central axis 402 of the resonant cavity 400, the intersection within the resonant cavity 400, and particularly at the point 406 of the radius 404; however, the intersecting point the central axis 414 and the central axis 402 need not be at the central point 406 of the radius 404 in other cases.

Still referring to FIG. 4, the air flow 316 directed toward the aperture 310 encounters the internal diameter 416 of the nozzle 308 (which internal diameter is fluidly coupled to the resonant cavity 400) after crossing the windward wall, and then the air flow encounters the leeward wall. The direction of air flow across the aperture is such that the acute angle α between direction of air flow 316 and the central axis 414 is between 10 and 80 degrees, and more particularly between 40 and 50 degrees, inclusive. Note, however, that in the example vortex tube 300, the direction of air flow 316 is substantially aligned with the central axis 402 of the resonant cavity 400. It follows that the amount of surface area presented to the air flow in the form of the tube 302 and/or hemispherical cap 312 is significantly less than, for example, vortex tube 100 of FIG. 1 for the same wind direction.

Likewise, the orientation of the aperture 310 to the central axis 414 of the nozzle 308 is a non-right angle. In particular, consider a line segment 420 (shown in dashed form) defined by two points on opposite sides of the aperture 310. The line segment 420 defined across the aperture 310 intersects the central axis 414 at a non-right angle. More particularly still, the acute angle β between the line segment 420 and the central axis 414 is between 10 and 80 degrees, and more particularly between 57 and 63 degrees, inclusive. It is noted that while the acute angle between α between the direction of air flow 316 and the central axis 414, and the acute angle β between the line segment 420 and the central axis 414, are disclosed to be within the same range of values, it does not necessarily follow that the respective angles are the same in practice. In fact, in a particular embodiment the acute angle α may be smaller than the acute angle β.

Still referring to FIG. 4, to quantify the length of the nozzle 308, FIG. 4 illustrates a length $L_N$. Given that the aperture 310 is defined by a non-right angle with respect to the central axis 414, the nozzle 308 defines a long or windward wall 452 and a short or leeward wall 454. For purposes of defining the length of the nozzle, the length $L_N$ in this specification (and in the claims) will be in reference to the leeward wall 454 between the aperture 310 at the first end 410 and the second end 412.

The complex structure of the vortex tube 300 does not lend itself well to a precise mathematical prediction of the resonant frequencies; however, as an example, a vortex tube similar to vortex tube 300 with an inside diameter 408 of the tube 302 of 8 inches, a resonant cavity length 400 of about 12 inches, an inside diameter 416 of the nozzle 308 of 4 inches, and a nozzle length $L_N$ of 2 inches was found to have a resonant frequency of about 120 Hertz (Hz).

A surprising result was discovered in that the ability of a vortex tube to extract energy from wind actually increases with a nozzle 308 having a smaller diameter 416 than the diameter 408 of the resonant cavity 400, within certain limits (discussed more below). Referring again to FIG. 4, the inventor of the present specification has found that for a nozzle and resonant cavity having inside diameters of circular cross-section, a smaller inside diameter 416 of the nozzle in relation to the inside diameter 408 of the resonant cavity 400 provides an increased efficiency of wind energy extraction. More particularly still, the inventor of the present specification has found that a relationship of the inside diameter 408 of the resonant cavity 400 to the inside diameter 416 of the nozzle 308 that provides an increased efficiency of wind energy extraction is about a 2:1 relationship. That is, the diameter 416 of the nozzle 308 should be about half the inside diameter of the main portion of the resonant cavity 400. So, for example, for a resonant cavity 400 having an inside diameter 408 of 8 inches, increased performance is achieved with a nozzle 308 having an inside diameter 416 of about 4 inches. It is to be understood that vortex tubes with different relationships as between the smaller inside diameter of the nozzle in relation to the inside diameter of the elongated chamber will be operational (e.g., 3 inch ID nozzle and 8 inch ID resonant cavity, 5 inch ID nozzle and 8 inch ID resonant cavity), and in fact may have increased efficiency over the straight vortex tube 100. However, there is a lower limit at which the inside diameter of the nozzle becomes too small to achieve increase efficiency (e.g., a 0.5 inch ID nozzle and 8 inch ID resonant cavity is unlikely to experience the increased efficiency).

Another surprising result was discovered in that the ability of a vortex tube to extract energy from wind actually increases when the central axis of the nozzle and the central axis of the elongated chamber are not coaxial. In one example system, the ability of a vortex tube to extract energy from wind increases when the second end 412 of the nozzle 308 couples to the resonant cavity 400 such that the central axis 414 of the nozzle 308 forms an angle with respect to the central axis 402 of the resonant cavity 402. Referring again to FIG. 4, the inventor of the present specification has found that increased efficiency can be achieved when the central axis 414 of the nozzle 308 is not coaxial with the central axis 402. More particularly, the inventor of the present specification has found that increased efficiency can be achieved when the central axis 414 of the nozzle 308 defines an acute angle γ with respect to the central axis 402, where the acute angle is between 45 and 55 degrees, and more particularly between 48 and 52 degrees, inclusive. It is noted that the relationships of the inside dimension of the nozzle and the inside dimension of the resonant cavity are not tied to the relationship regarding the angle formed by the central axis 414 and the central axis 414. Indeed, improvement in efficiency may be obtained with a nozzle structure as described where the central axis 414 and central axis 402 are coaxial.

Finally, the inventor of the present specification has found that certain physical relationships of the nozzle to itself are useful in ensuring increased energy extraction from the wind. In particular, in some cases the leeward wall length $L_N$ defined between the distal or first end 410 of the nozzle and the proximal or second end 412 of the nozzle should be less than the inside diameter 416 of the of the nozzle 308. More particularly still, in some example cases the leeward wall 454 length $L_N$ should be between 25% and 50%, inclusive, of the length of the inside diameter 416 of the nozzle 308. Thus, in the example system where the inside diameter 416 is 4 inches, a leeward wall 454 length $L_N$ of between 1 and 2 inches works better. Other leeward wall lengths $L_N$ are also operational, but with decreased efficiency (e.g., for the 4 inch ID nozzle, leeward wall lengths $L_N$ of from 2-3 inches are operational).

The specification now turns to another physical relationship of components that increases efficiency of extracting energy from wind-edge driven resonant cavity. Referring again to FIG. 4, in the example system the nozzle 308 couples to the resonant cavity 400 such that the second end 412 of the nozzle 308 is disposed proximate the wall of the tube 302. Stated otherwise, the inside diameter 416 of the nozzle 308 opens into the resonant cavity 400 in an off-center orientation. For purposes of convenience, the specification refers to the arrangement as an edge driven resonant cavity.

Figure 5:
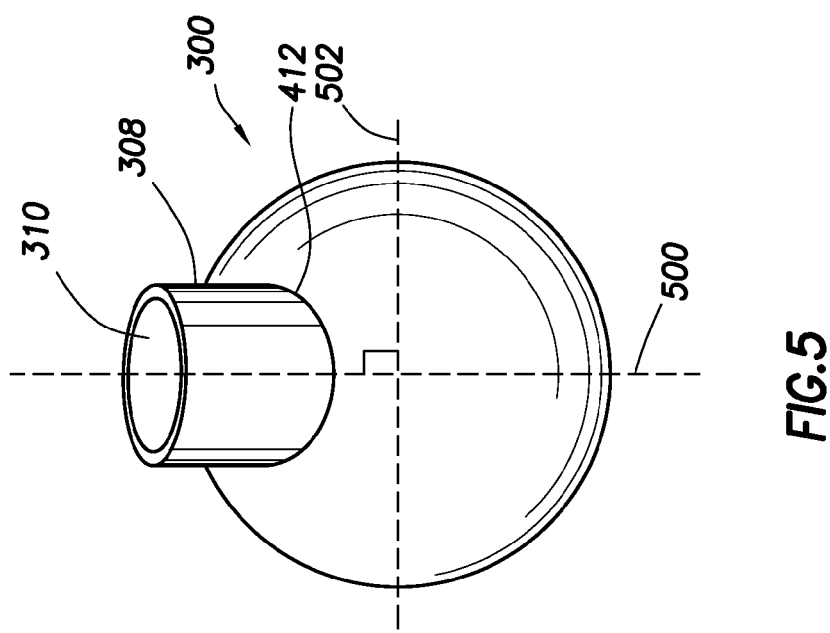
FIG. 5 shows a front elevation view of a vortex tube in accordance with at least some embodiments.

FIG. 5 shows a front elevation view of the vortex tube 300 in accordance with at least some embodiments. In particular, in the view of FIG. 5 the hemispherical cap 312 is seen, along with the nozzle 308. Because of the angle of the aperture 310, the aperture 310 is likewise visible in FIG. 5. In the example arrangement of FIG. 5, the second end 412 of the nozzle 308 couples to the hemispherical cap 312 such that the nozzle 308 is not centered at the apex of the hemispherical cap 312. Rather, in the arrangement of FIG. 5, the nozzle 308 is bisected by a vertical line 500 that bisects the hemispherical cap (i.e., the line 500 passes through the apex of the hemispherical cap 312), and likewise the nozzle 308 is disposed or resides partially within only two quadrants defined by a line 502 that also bisects the hemispherical cap at a right angle to the line 500. The resulting relationships of the central axis of the nozzle 308 (the central axis of the nozzle not shown in FIG. 5) and the central axis of the resonant cavity (the central axis of the resonant cavity is perpendicular to the page in FIG. 5) is that the central axis of the nozzle and the central axis of the resonant cavity intersect within the resonant cavity. Returning briefly to FIG. 4, in the example system the central axis 414 of the nozzle 308 intersects the central axis 402 of the resonant cavity 400 at the point 406. However, in other example systems the central axis of the nozzle and the central axis of the resonant cavity need not intersect.

Figure 6:
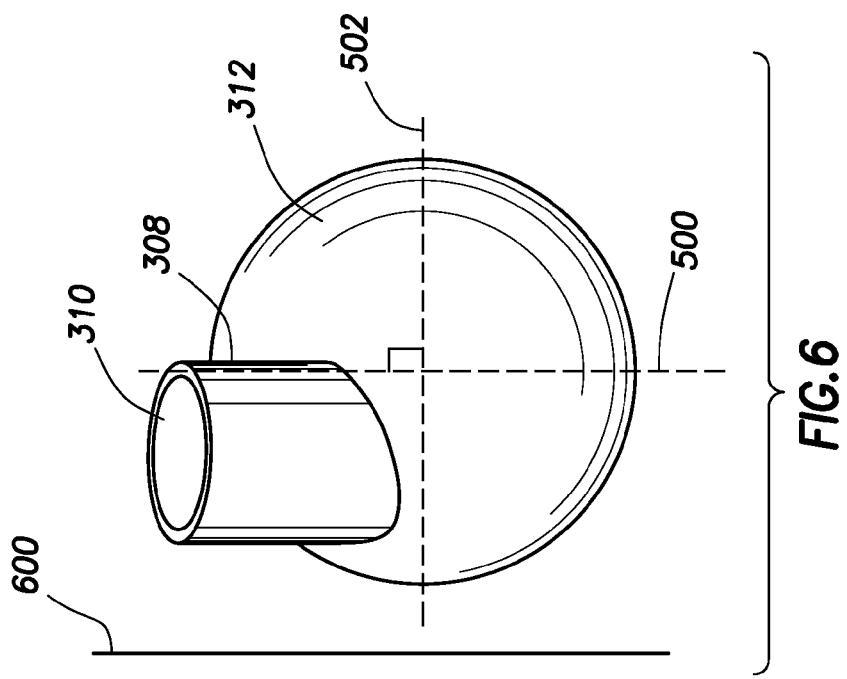
FIG. 6 shows a front elevation view of a vortex tube in accordance with at least some embodiments.

FIG. 6 shows a front elevation view of an alternative arrangement of the nozzle 308 in relation to the hemispherical cap 312. In particular, in the example system of FIG. 6 the nozzle 308 is coupled to the hemispherical cap 312 in such a way that the inside diameter 416 of the nozzle 308 opens into the resonant cavity 400 in an off-center arrangement, but where the central axis of the nozzle 308 will not intersect with the central axis of the resonant cavity. Stated otherwise, the nozzle 308 is not centered with respect to line 500 that bisects the hemispherical cap. Rather, in the arrangement of FIG. 5, the nozzle 308 resides substantially within a quadrant defined by vertical line 500 that bisects the hemispherical cap in one direction and line 502 that also bisects the hemispherical cap at a right angle to the line 500. In the example situation, however, the angle relationships of the central axis of the nozzle and the central axis of the resonant cavity may still be met. That is, if the central axis of the nozzle 308 and the central axis of the resonant cavity are projected onto a plane parallel to both (such as a plane 600, which, in the view of FIG. 6, is shown as a line), the angle between the projected central axis of the nozzle 308 and the projected central axis of the resonant cavity have the same relationships as discussed above. Of course, in the example system shown in FIG. 5 the projections of each central axis onto a plane has the same relationship.

The various embodiments of the vortex tube discussed to this point have implicitly assumed that the central axis of the resonant cavity be substantially parallel to the direction of air flow. However, the surprising results of increased efficiency in extracting energy from wind in the form of an edge driven resonant cavity, a nozzle with smaller inside diameter than the resonant cavity, and/or non-coaxial relationships of the nozzle and resonant cavity are not limited to just cases where the central axis of the resonant cavity aligns with the wind.

Figure 7:
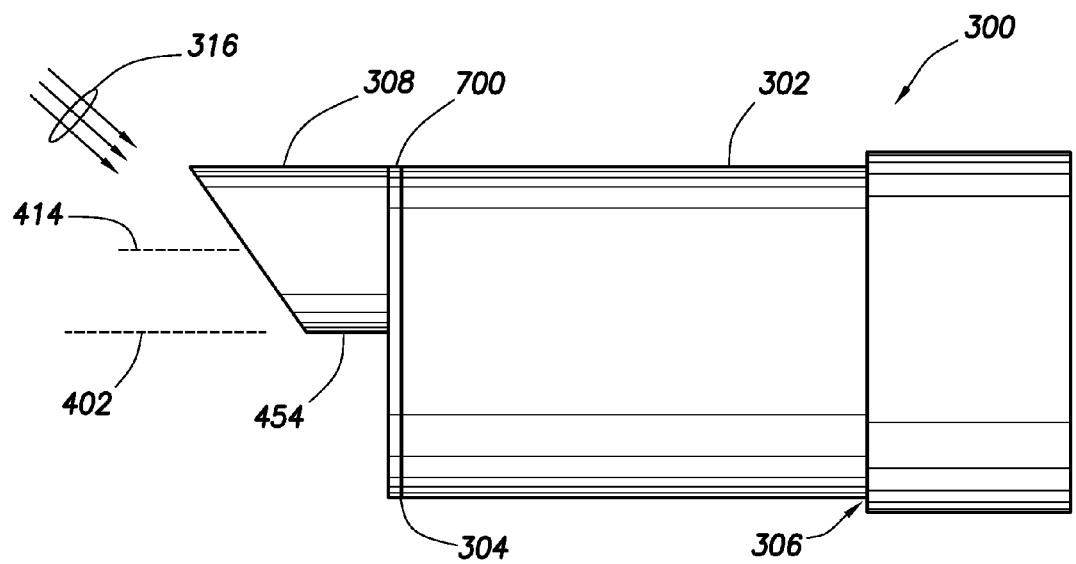
FIG. 7 shows a side elevation view of a vortex tube in accordance with at least some embodiments.

FIG. 7 shows a side elevation view of a vortex tube in accordance with yet still further example systems. In particular, FIG. 7 shows a vortex tube 300 that comprises a cylindrical outer body or tube 302 that defines a resonant cavity (the resonant cavity not visible in FIG. 7). The tube 302 defines a first end 304 and a second end 306 opposite the first end 304. The vortex tube 300 further comprises a nozzle 308 coupled to the first end 304. Unlike the example systems of FIG. 3, vortex tube 300 does not comprise the hemispherical cap, and instead the first end 304 may be sealed with a flat plate or end cap 700. Moreover, the relationship of the nozzle 308 to the resonant cavity is such that the central axis is parallel to the central axis 402 of the resonant cavity, and in the example system shown the leeward wall 454 of the nozzle is proximate the central axis 402 of the resonant cavity. Thus, in the example system of FIG. 7 the central axis 414 of the nozzle 308 does not intersect the central axis 402 of the resonant cavity. Regardless, the example system of FIG. 7 does otherwise utilize the nozzle 308 with smaller inside diameter than the inside diameter of the resonant cavity and the edge driven aspects. Such an arrangement may be desirable in some circumstances.

Figure 8:
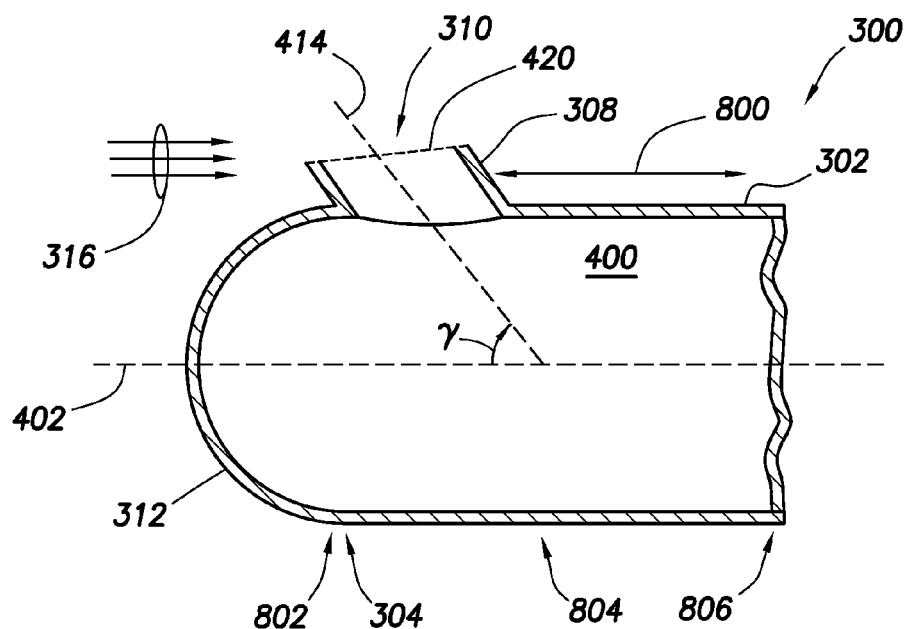
FIG. 8 shows a cross-sectional elevation view of a vortex tube in accordance with at least some embodiments.

The edge driven aspects of the resonant cavity, however, are not limited to just the distal end of the resonant cavity, or just to use with a hemispherical cap. In other example systems, the nozzle may couple to the tube 302 that defines the resonant cavity. FIG. 8 shows a cross-sectional elevation view of a vortex tube 300 in accordance with yet still further example systems. In particular, FIG. 8 shows a system where the nozzle 308 couples to the tube 302 rather than the hemispherical cap 312 as in FIG. 3, or an end cap 700 as in FIG. 7. The nozzle 308 defines a central axis 414 that is parallel to the central axis 402 of the resonant cavity 400 within the resonant cavity. As before, the acute angle γ as between the central axis 414 and the central axis 402 is between 10 and 80 degrees, and more particularly between 40 and 40 degrees, inclusive. Further, off-center placements are possible where the acute angle γ is measured in a projection of the both the central axis 414 and the central axis 402 onto a plane.

Although FIG. 8 shows the nozzle 308 at the distal or first end 304 of the resonant cavity, the nozzle 308 may be placed at any suitable location along the tube 302, as illustrated by double-headed arrow 800. That is, the nozzle 308 may be placed at a distal portion 802 in relation to the resonant structure, a medial portion 804 in relation to the resonant structure, or a proximal portion 806 in relation to the resonant structure. Moreover, while less wind resistance is presented by any of the example vortex tubes 300 when the central axis 402 is aligned with the air flow 316, such need not be the case, and thus the nozzle 308 may be turned such that the line segment 420 (defined by opposite sides of the ellipse define by the aperture 310) and the central axis 402 are non-planar.

Figure 9:
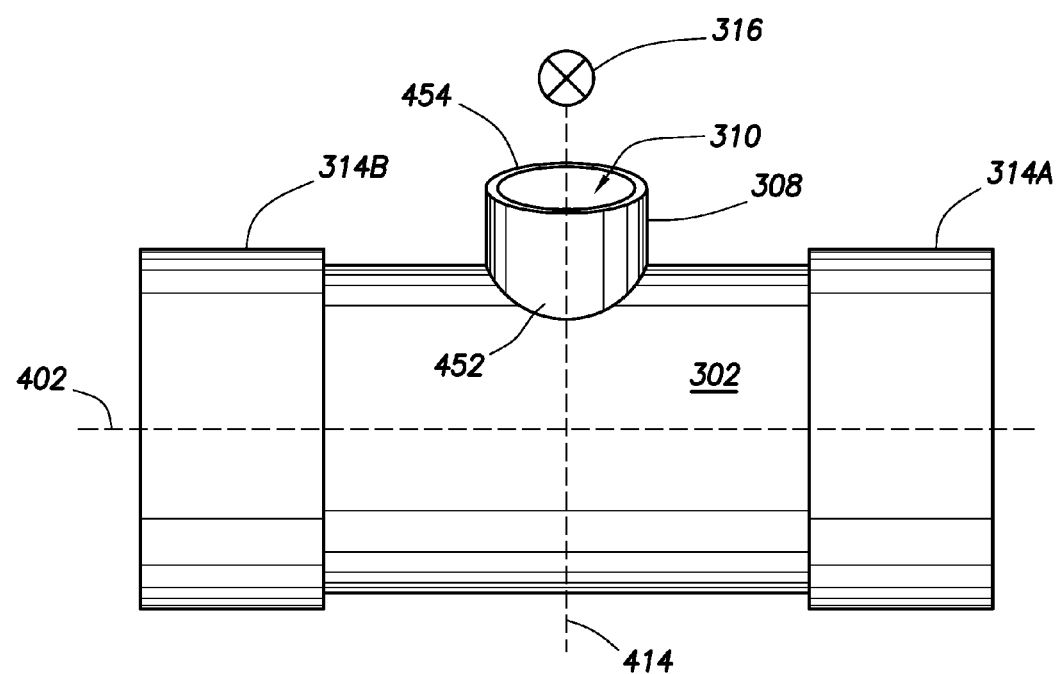
FIG. 9 shows a side elevation view of a vortex tube in accordance with at least some embodiments.

FIG. 9 shows an elevation view of a vortex tube in accordance with yet still further example systems. In particular, the system of FIG. 9 shows examples of several different variations, which variations are not necessarily present in the same device. Firstly, FIG. 9 shows a variation of the "side launch" systems where the illustrative nozzle 308 couples to the tube 302 that defines the resonant cavity. Thus, the central axis 414 of the nozzle 308 intersects the central axis 402 of the resonant cavity, the intersection is within the resonant cavity, and the angle formed between the central axis 414 and the central axis 402 is a right angle. Further, the aperture 310 of the nozzle 308 is turned such that the nozzle 308 is arranged for an air flow direction into the page, as shown by the symbol associated with the reference number 316. Thus, the line segment defined between a point on the windward wall 452 and a point on the leeward wall 454 (the line segment not specifically shown, as it is covered by the indication of the central axis 414) is not coplanar with the central axis 402, and in the example situation the line segment is perpendicular to the central axis 402.

Finally with respect to FIG. 9, the example system has two resonant structures—resonant structure 314A coupled on one end, and resonant structure 314B coupled on the opposite end. In this way, energy (e.g., mechanical energy, electrical energy) can be extracted from the oscillatory motion induced in each resonant structure 314 simultaneously. The specification now turns to considerations regarding operation of a vortex tube over a range of wind speeds that might be expected at any particular location.

Outside the context of vortex tubes, the frequency of vortex shedding is related to the wind velocity—the faster the wind, the higher the frequency of the vortex shedding. However, vortex tubes in accordance with the various example systems experience a phenomenon termed "frequency locking." That is, the combination of the nozzle 308 and the resonant frequency of the resonant cavity 400 work together to ensure a substantially constant vortex shedding frequency (being substantially the same as the selected resonant frequency of the resonant cavity) in spite of changes of velocity of the air flow across the nozzle that would otherwise cause a change in vortex shedding frequency.

Vortex shedding within the nozzle 308 of vortex tube 300 may be characterized by a dimensionless number known as the Strouhal number, and the Strouhal number may be given approximately by the following equation:

$$St = \frac{f_v L_a}{V} \tag{1}$$

where St is the Strouhal number, $f_v$ is the frequency of vortex shedding, $L_a$ is the length across the aperture 310 measured in the direction of the air flow, and V is the velocity of air flow. For example, for the illustrative nozzle 308 having angle β (FIG. 4) of 28 degrees, a diameter of 4 inches (0.1016 meters) (implying a $L_a$ of 0.1155 meters), a vortex shedding frequency of 120 Hertz for the resonant cavity 400, and an air flow velocity across the nozzle of about 10 meters/second (m/s) (about 22 MPH), the Strouhal number according to equation (1) is approximately 1.4. Now consider the same system, but with an air flow velocity of 35 m/s (about 80 MPH). At 35 m/s, and based on the frequency locking, the Strouhal number according to equation (1) become approximately 0.39. Stated otherwise, for the example system the vortex shedding frequency at the nozzle 308 remains substantially constant over a range of Strouhal numbers from about 0.39 to about 1.4.

The frequency locking phenomenon thus means a vortex tube 300 can be used over a wide range of air flow velocities, yet with the vortex tube 300 still operating at the particular resonant frequency of the resonant cavity. In an example system of creation of electrical energy from air flow such as wind, each vortex tube 300 may be designed to operate over a range of air flow velocities expected for the particular location, with emphasis on the average wind speed and above. Thus, using the example commercial scale vortex tube above (having a nozzle with a 4 inch inside diameter, a resonant cavity with an 8 inch inside diameter and 12 inch length), the vortex shedding frequency should be locked to the resonant frequency of the resonant cavity 400 over the wide range of air flow velocity from about 22 to 80 MPH (the higher wind speed ranges at which large propeller-based wind generation self-throttle). Below the 22 MPH, and above the 80 MPH, the example vortex tube 300 may not frequency lock, and thus may not produce extractable energy. However, the range of wind speeds over which the vortex tube 300 operates without modification may be part of the design of the tube 302 and nozzle 308, and thus 22 to 80 MPH is merely illustrative. Upper ranges of 100 MPH are likewise feasible. The next consideration is how to increase wind energy extraction, particularly at lower air flow velocities.

Figure 10:
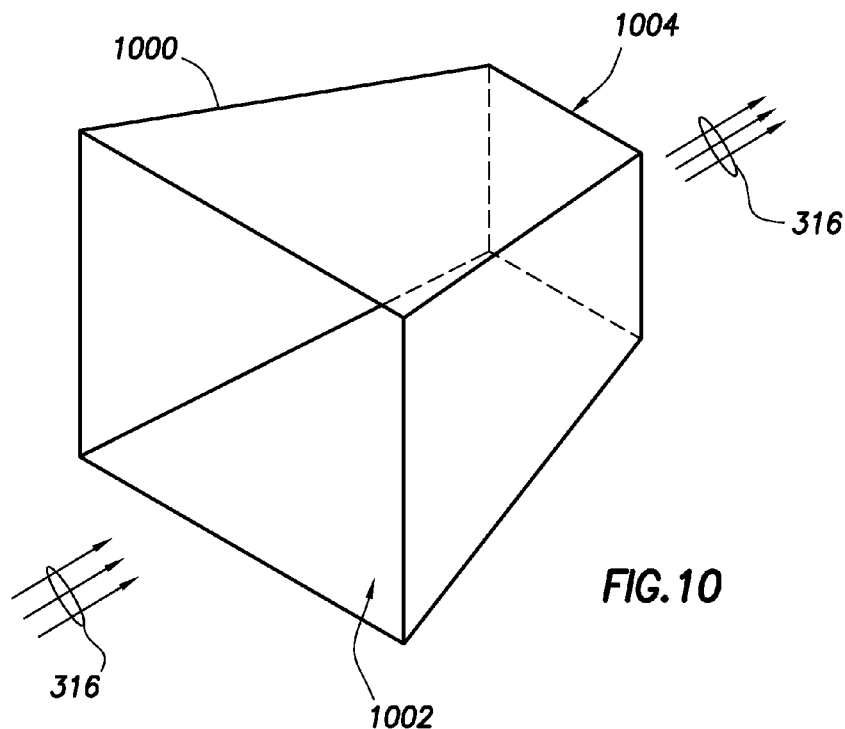
FIG. 10 shows a perspective view of a venturi in accordance with at least some embodiments.

Although possible for a vortex tube 300 to be operated as a stand-alone system, with energy extracted directly proportional to ambient air flow velocity, in other example systems the energy extraction is increased (particularly at lower air flow velocities) by a venturi structure in operational relationship with the nozzle 308. FIG. 10 shows a perspective view of an example venturi 1000 in accordance with at least some embodiments. In particular, the venturi 1000 comprises a collection aperture 1002 and an exit aperture 1004. As the name "venturi" implies, the swept or collection area of entrance aperture 1002 is larger than the area of the exit aperture 1004. Under Bernoulli's principle, as the air flow 316 collected at the collection aperture 1002 moves along the venturi 1000 (that is, as the cross-sectional area through which the air flow moves decreases) the velocity of the air flow increases. Stated otherwise, the air flow velocity at the collection aperture 1002 has a first value dependent upon the ambient air flow velocity. As a portion of the ambient air flow that enters the venturi 1000 encounters a smaller cross-sectional area, the air flow velocity increases proportional to the change in cross-sectional area. More particularly, the velocity of the air flow in the venturi 1000 will be given approximately by the equation:

$$V_2 = \frac{A_1 V_1}{A_2} \tag{2}$$

where $V_2$ is the velocity of the air flow at the exit aperture 1004, $A_1$ is the cross-sectional area of the collection aperture 1002, $V_1$ is the velocity at the collection aperture 1002 (i.e., the ambient air flow velocity), and $A_2$ is the cross-sectional area of the exit aperture 1004.

Figure 11:
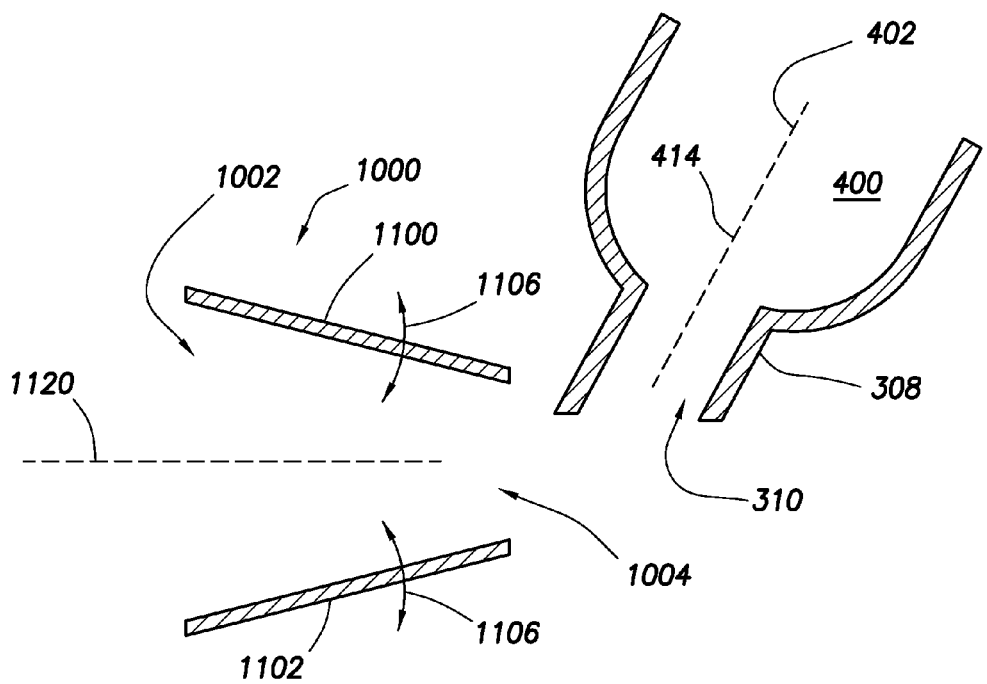
FIG. 11 shows a cross-sectional elevation view of a venturi in operational relationship to a vortex tube in accordance with at least some embodiments.

FIG. 11 shows a cross-sectional elevation view of the venturi 1000 and a portion of a vortex tube 300 in accordance with at least some embodiments. In particular, FIG. 11 shows an upper wall 1100 and a lower wall 1102 of the venturi 1000. The exit aperture 1004 is in operational relationship with the aperture 310 of the nozzle 308. That is, at least a portion of the air flow that exits the exit aperture 1004 is incident upon the aperture 310 of the nozzle 308. FIG. 11 also shows that any of a variety of relationships of the nozzle 308 may be implemented. In the example system of FIG. 11, the nozzle 308 is oriented downwardly, the central axis 402 and the central axis 414 are coaxial, and the central axis 402 is sloped such that any liquids within the resonant cavity 400 (e.g., condensation, precipitation) may drain. Stated otherwise, the central axis 402 and the axis 1120 of air flow into the venturi 1000 are not parallel in the example system, but any of the example vortex tubes discussed in this application may be used with the venturi 1000.

Turning again to the venturi 1000, in accordance with the example systems, the venturi 1000 has a variable relationship of the area of the collection aperture 1002 to the area of the exit aperture 1004. The variable relationship of the areas may be implemented in a variety of ways. In some systems the walls 1100 and/or 1102 of the venturi 1000 may be moved by an electromechanical system responsive to air flow velocity using a positioning system (e.g., linear actuator, motor and lead screw assembly), where example movement is shown by arrows 1106. In yet still other example systems, a mechanical system that adjusts the gate structure based purely on mechanically measured air flow velocity may be used, and in some example systems with the energy to move the walls may be derived from the air flow itself. Although in FIG. 11 only the upper wall 1100 and lower wall 1102 are shown, and are shown to be moveable, in yet still other cases only one of the walls may be moveable. Further still, the side walls may likewise be implemented in such a way as to help control the relationship of the area of the entrance aperture 1002 and the exit aperture 104.

In some example systems, the venturi 1000 implements a 4:1 relationship of the velocity at the entrance aperture 1002 to the velocity at the exit aperture 1004, and the relationship may decease with increasing wind speed. For example, an initial 4:1 relationship may be maintained for ambient air flow velocity from zero to 20 MPH (implying an 80 MPH velocity at the nozzle 308 at 20 MPH ambient air flow velocity), and with relationships changing proportional to ambient air flow velocity over the range of 20 MPH to 80 MPH such that, at the 80 MPH the relationship of velocities is 1:1. In this example situation, over the range of ambient air flow velocity from about 5 MPH to about 80 MPH, the air flow velocity at the nozzle ranges from about 20 MPH to about 80 MPH. Thus, the range over which the vortex tube 300 is producing usable power is significantly wider than the range for the propeller-driven cousins of the vortex tube.

Not only does the venturi expand the operable range of ambient air flow velocities over which a vortex tube can operate, but the venturi also implements a power gain. The power of the air flow collected at the entrance aperture 1002 may be defined by the following equation:

$$P_{IN} = \frac{1}{2}\rho A_1 V_1^3 \tag{3}$$

where $P_{IN}$ is the power of the air flow collected at the entrance aperture 1002, $\rho$ is the density of the air, $A_1$ is area of the entrance aperture 1002, and $V_1$ is the velocity of the air flow. The power contained in the air flow at the exit aperture 1004 likewise in given by the following equation:

$$P_{OUT} = \frac{1}{2}\rho A_2 V_2^3 \tag{4}$$

where $P_{OUT}$ is the power of the air flow exiting the exit aperture 1004, $A_2$ is area of the exit aperture 1002, and $V_2$ is the velocity of the air flow at the exit aperture 1004. So the power gain across the venturi 1000 is:

$$P_{GAIN} = \frac{P_{OUT}}{P_{IN}} \frac{A_2 V_2^3}{A_1 V_1^3} \tag{5}$$

where $P_{GAIN}$ is the power gain. Using the example system 4:1 relationship of the velocity at the entrance aperture 1002 to the velocity at the exit aperture 1004 (and keeping in mind that a 4:1 velocity relationship also implies a 4:1 relationship of area of the entrance aperture 1002 to area of the exit aperture 1004), the power gain $P_{GAIN}$=16 in the example system during periods of time when the 4:1 velocity relationship is being held, and decreasing to a $P_{GAIN}$=1 where the velocity relationship changes to 1:1. If a system is considered that holds an 8:1 relationship of the velocity at the entrance aperture 1002 to the velocity at the exit aperture 1004, the power gain $P_{GAIN}$=64 during periods of time when the 8:1 velocity relationship is being held (and decreasing to a $P_{GAIN}$=1 where the velocity relationship changes to 1:1). The point is, the venturi 1000 results in a passive power gain across the venturi 1000 of which the vortex tube 300 can then take advantage to extract useful energy, even at ambient air flow velocities well below that which would ensure proper Strouhal numbers if the ambient air flow was applied to the nozzle 308 without the venturi 1000.

A point regarding conservation of energy is in order. The system described does not violate natural laws regarding conservation of energy; rather, the system described is, in effect, a spatially localized power gain. When the total energy is considered (e.g., energy over an area the size of the area of the entrance aperture, but considered at the physical location of the exit aperture), the total energy is conserved. Stated otherwise, the power gain is a gain only within the area of the exit aperture, and such power gain is at the expense of a power loss in other areas (the area around but not within the exit aperture). The specification now turns to example resonant structures 314.

Figure 12:
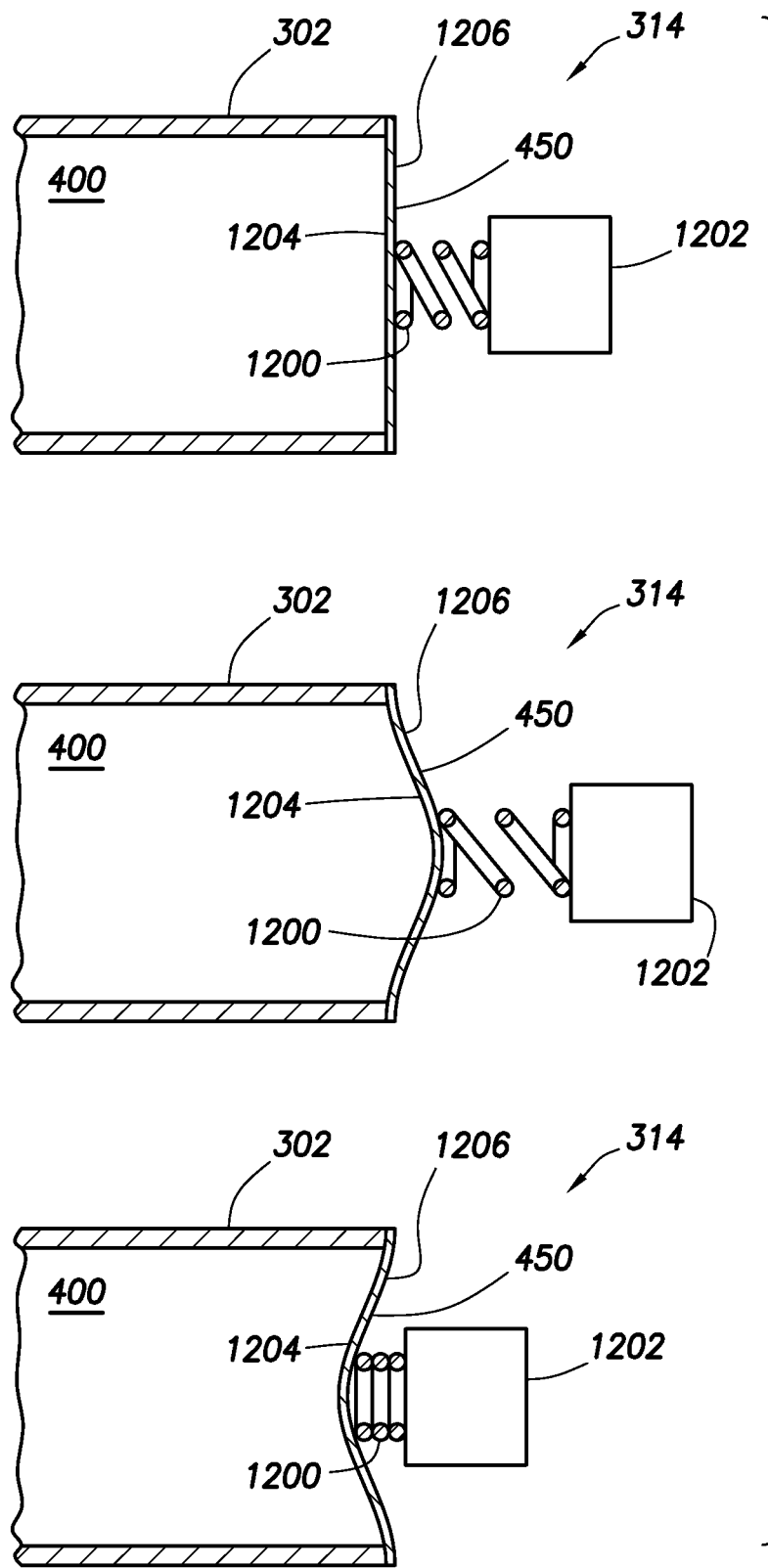
FIG. 12 shows a series of cross-sectional elevation views to show example operation of a resonant structure in accordance with at least some embodiments.

FIG. 12 shows a plurality of cross-sectional side elevation views of an end of the tube 302 with an example resonant structure 314, with the difference between the views being only the particular state of the resonant structure 314. In particular, the resonant structure 314 in the example system is coupled to an end of the resonant cavity 400 opposite the nozzle (not visible in FIG. 12). The illustrative resonant structure 314 comprises flexible diaphragm 450. In the example of FIG. 12, the flexible diaphragm 450 fully occludes the end of the resonant cavity 400, but any system where acoustic waves within the resonant cavity can interact with the flexible diaphragm 450 is contemplated. In some cases the flexible diaphragm 450 is a metallic structure with concentric grooves or ridges that enable distortion of the flexible diaphragm. In yet still other embodiments, the flexible diaphragm 450 is a polymer material (e.g., neoprene) having an inherent elasticity. In further embodiments still, the flexible diaphragm 450 may be a thin metal membrane having sufficient inherent elasticity.

In the example system the flexible diaphragm 450 couples to a spring 1200 (illustrative shown as a coil spring) and a mass 1202. The spring 1200 and mass 1202 form a mechanical harmonic oscillator, where the frequency of oscillation may be given approximately by the following equation:

$$f_{SM} = \frac{1}{2\pi}\sqrt{\frac{K}{M}} \quad (6)$$

where $f_{sm}$ is the oscillation frequency of the spring and mass system, K is the spring constant for spring 1200, and M is the mass of mass 1204. Thus, in the illustrative case of the resonant structure 314 being a spring and mass system, the spring constant K and mass M are selected such that the resonant frequency of the resonant structure 314 is substantially the same as the resonant frequency of the resonant cavity 400 and/or the vortex shedding frequency of the nozzle 208.

Pressure or acoustic waves within the resonant cavity 400 (e.g., standing waves) create a time-varying pressure differential between an interior surface 1204 of the flexible diaphragm 450 and the exterior surface 1206 of the flexible diaphragm 450. The differential pressure thus acts to distort the diaphragm 450. In particular, the during periods of time when the pressure on the interior surface 1204 is higher than on the exterior surface 1206, the flexible diaphragm 450 tends to bulge outward and away from the resonant cavity 400, the outward bulge shown by middle view of FIG. 12. Likewise, during periods of time when the pressure on the interior surface 1204 is lower than on the exterior surface 1206, the flexible diaphragm 450 tends to bulge inward and toward the resonant cavity 400, the inward bulge shown by lower view of FIG. 12. Upper view of FIG. 12 represents either a rest state of the system, or an intermediate condition between the outward and inward bulges. Inasmuch as the frequency of acoustic waves within the resonant cavity 400 and the selected resonant frequency of the resonant structure are designed and constructed to be substantially the same, the motion of the flexible diaphragm results in oscillatory motion of the spring 1200 and mass 1202 system. Stated otherwise, the resonant structure 314 is excited by the acoustic waves within the resonant cavity. In accordance with the various embodiments, energy is extracted from the resonant structure 314 based on the oscillatory motion.

FIG. 13 shows a cross-sectional elevation view of an example system for extracting mechanical energy, as well as a different example resonant structure. In particular, the resonant structure 314 of FIG. 13 comprises a flexible diaphragm 450 in the form resilient member (e.g., neoprene having a thickness of about 0.0312 inch). The mass 1202 (e.g., an object weighing between 0.25 pound (lb.) to 0.5 lb. for a resonant frequency of about 120 Hz) is coupled directly to the flexible diaphragm 450. In these example systems, the "spring force" for the mechanically resonant structure is provided by the elasticity of the neoprene, and thus no physical spring is used. A connecting rod 1300 couples to mass 1202 and the flexible diaphragm 450. As the resonant structure 314 oscillates, reciprocating mechanical energy may be extracted from the end 1302 of the rod 1300, such as to turn a wheel or shaft 1304 (the axis of rotation of the shaft perpendicular to the page). The upper view of FIG. 13 shows the flexible diaphragm 450 in transition between bulging inward and bulging outward. In this situation, kinetic energy of the mass 1202 (and, for that matter, all the components of the resonant structure 314) may be at a maximum and the potential energy at a minimum. The lower picture shows the flexible diaphragm 450 in the bulging outward condition. As the outward movement of the diaphragm 450 slows because of localized peaking pressure within the resonant cavity 400, the kinetic energy within the system may be at minimum, but with the flexible diaphragm 450 stretched, potential energy may be at a maximum. The cycle continues, and the movement of the diaphragm may be extracted as mechanical energy. The mechanical energy may be used for any suitable purpose.

FIG. 14 shows a cross-sectional elevation view of an example system for extracting electrical energy. In particular, the example system of FIG. 14 comprises the flexible diaphragm 450 in the form of a neoprene sheet coupled directly to the mass 1202 as in FIG. 13, but here the mass couples to a bobbin structure 1400 (i.e., a hollow cylindrical tube), with windings 1402 coupled to the bobbin 1400 on a distal end of the bobbin 1400. The windings 1402 on the bobbin 1400 are in operational relationship to a permanent magnet 1404, and in the example system the distal end of the bobbin 1400 and the windings extend into an annular groove 1406 within the magnetic 1404. The magnet 1402 is illustratively held in place by a structure 1408, but other structures for holding the magnet 1402 in place may be equivalently used. As the mass 1202 and windings 1402 oscillate in response to acoustic waves in the resonant cavity 400, the windings 1402 move through the magnetic field lines of the magnet 1404 (as shown by double-headed arrow 1410), thus creating electrical energy on leads 1412. In the illustrative system, the voltage generated on the leads 1412 will be time varying, and have a frequency being substantially the same as the resonant frequency of the resonant structure 314. While FIG. 14 shows the magnetic 1404 rigidly fixed and the windings 1402 moved by the resonant structure 314, in other embodiments the magnet may be associated with the mass 1202, along with rigidly fixed windings. In yet still other embodiments, the magnet creating the magnetic field (whether stationary or moving) may be an electromagnet rather than permanent magnet.

Figure 15:
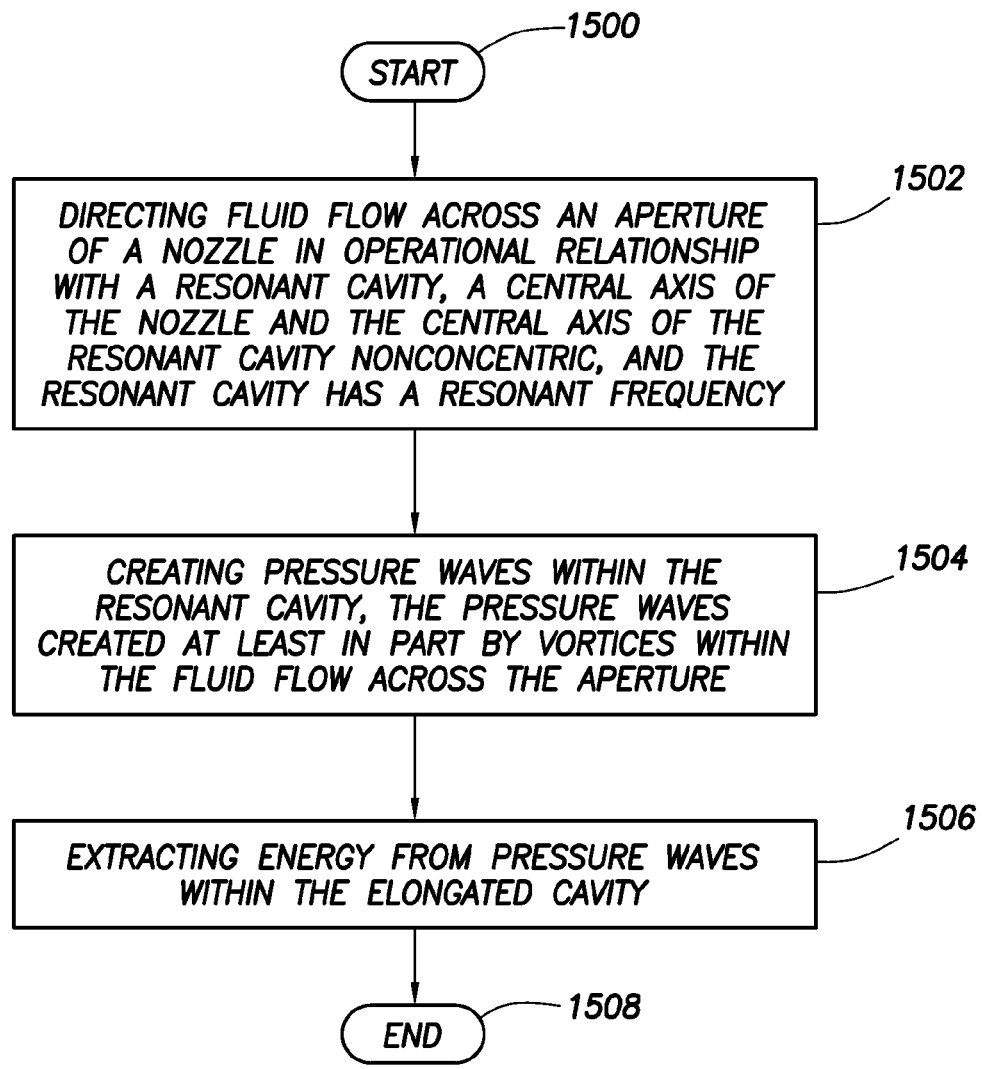
FIG. 15 shows a method in accordance with at least some embodiments.

FIG. 15 shows method in accordance with at least some embodiments. In particular, the method starts (block 1500) and proceeds to directing fluid flow across an aperture of a nozzle in operational relationship with an resonant cavity, a central axis of the nozzle and the central axis of the resonant cavity nonconcentric, and the resonant cavity has a resonant frequency (block 1502). Directing the fluid flow may result in creating pressure waves within the resonant cavity, the pressure waves created at least in part by vortices within the fluid flow across the aperture (block 1504). Finally, the method may comprise extracting energy from pressure waves within the resonant cavity (block 1506), and thereafter the method ends (block 1508).

References to "one embodiment," "an embodiment," "some embodiments," "various embodiments", "example embodiments" or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising: directing fluid flow across an aperture of a nozzle in operational relationship with a resonant cavity, a central axis of the nozzle and the central axis of the resonant cavity are nonconcentric, and the resonant cavity has a resonant frequency; creating pressure waves within the resonant cavity, the pressure waves created at least in part by vortices within the fluid flow across the aperture; and extracting energy from pressure waves within the resonant cavity; wherein directing the fluid flow further comprises directing the fluid flow across the aperture of the nozzle where the central axis of the nozzle and the central axis of the resonant cavity are parallel.

2. A method comprising: directing fluid flow across an aperture of a nozzle in operational relationship with a resonant cavity, a central axis of the nozzle and the central axis of the resonant cavity are nonconcentric, and the resonant cavity has a resonant frequency; creating pressure waves within the resonant cavity, the pressure waves created at least in part by vortices within the fluid flow across the aperture; and extracting energy from pressure waves within the resonant cavity; wherein directing the fluid flow further comprises directing the air flow across the aperture of the nozzle where the nozzle has an inside dimension, the resonant cavity has an inside dimension, and where the inside dimension of the nozzle is smaller than the inside dimension of the resonant cavity.

3. A system comprising: a resonant cavity that has a central axis, a first end, a second end, an inside dimension, and a resonant frequency; a first resonant structure coupled to the second end of the resonant cavity, the resonant structure configured to mechanically oscillate at the resonant frequency; a nozzle comprising: a first end and a second end; a central axis; an internal volume, the internal volume fluidly coupled to the resonant cavity; an inside dimension; and an aperture defined on the first end of the nozzle, where two points on opposite sides of the aperture define a line segment, and the line segment intersects the central axis of the nozzle at a non-right angle; wherein the central axis of the resonant cavity and the central axis of the nozzle are coaxial; and wherein the inside dimension of the nozzle is less than the inside dimension of the resonant cavity.

4. The system of claim 3 further comprising: wherein the inside dimension of the nozzle is an inside diameter; wherein the inside dimension of the resonant cavity is an inside diameter; wherein the inside diameter of the nozzle is about half the inside diameter of the resonant cavity.

5. The system of claim 3 wherein the nozzle couples to the resonant cavity at a first end of the resonant cavity opposite the resonant structure.

6. The system of claim 3 further comprising: a hemispherical cap coupled to the first end of the resonant cavity; and the nozzle coupled to the hemispherical cap.

7. The system of claim 3 wherein the inside dimension of the nozzle is an inside diameter, and the nozzle defines a short wall having a length, and wherein the length of the short wall is less than the inside diameter of the nozzle.

8. The system of claim 3 wherein the inside dimension of the nozzle is an inside diameter, and the nozzle defines a short wall having a length, and wherein the length of the short wall is about half the inside diameter of the nozzle.

9. The system of claim 3 further comprising: a Venturi that defines an entrance aperture and an exit aperture, the entrance aperture arranged to collect ambient airflow, and the exit aperture in operational relationship to the nozzle; wherein the Venturi increases the velocity of the airflow directed to the nozzle in relation to the velocity of ambient airflow.

* * * * *